United States Patent [19]

Foldes

[11] 3,936,838
[45] Feb. 3, 1976

[54] MULTIMODE COUPLING SYSTEM INCLUDING A FUNNEL-SHAPED MULTIMODE COUPLER

[75] Inventor: Peter Foldes, Montreal, Canada
[73] Assignee: RCA Corporation, New York, N.Y.
[22] Filed: May 16, 1974
[21] Appl. No.: 470,574

[52] U.S. Cl. ............... 343/786; 343/16 M; 343/858; 333/6
[51] Int. Cl.² .................... H01Q 13/00; G01S 9/22
[58] Field of Search ....... 343/786, 858, 16 M; 333/6

[56] References Cited
UNITED STATES PATENTS

| | | | |
|---|---|---|---|
| 3,423,756 | 1/1969 | Foldes | 343/786 |
| 3,566,309 | 2/1971 | Ajioka | 343/786 |
| 3,665,481 | 5/1972 | Low et al. | 343/786 |
| 3,696,434 | 10/1972 | Sciambi | 343/786 |

Primary Examiner—Eli Lieberman
Attorney, Agent, or Firm—Edward J. Norton; Robert L. Troike

[57] ABSTRACT

A multimode coupling system includes a funnel-shaped coupling member having one coupling aperture at the narrow end thereof, one larger coupling aperture at the larger end thereof, and a plurality of coupling apertures in the side wall thereof. A first and second of these side wall apertures lie in a first common plane on diametrically opposite surfaces of the member. A third and fourth of these apertures lie in a second common plane orthogonal to the first and on diametrically opposite surfaces of the member. A coupling circuit is provided between the plurality of side wall coupling apertures and an asymmetrical mode terminal for advancing the phase of signals at the first and third side wall apertures approximately 90° relative to the phase of signals at the second and fourth side wall apertures to thereby achieve coupling of asymmetrical mode signals between the larger end and the asymmetrical mode terminal.

23 Claims, 10 Drawing Figures

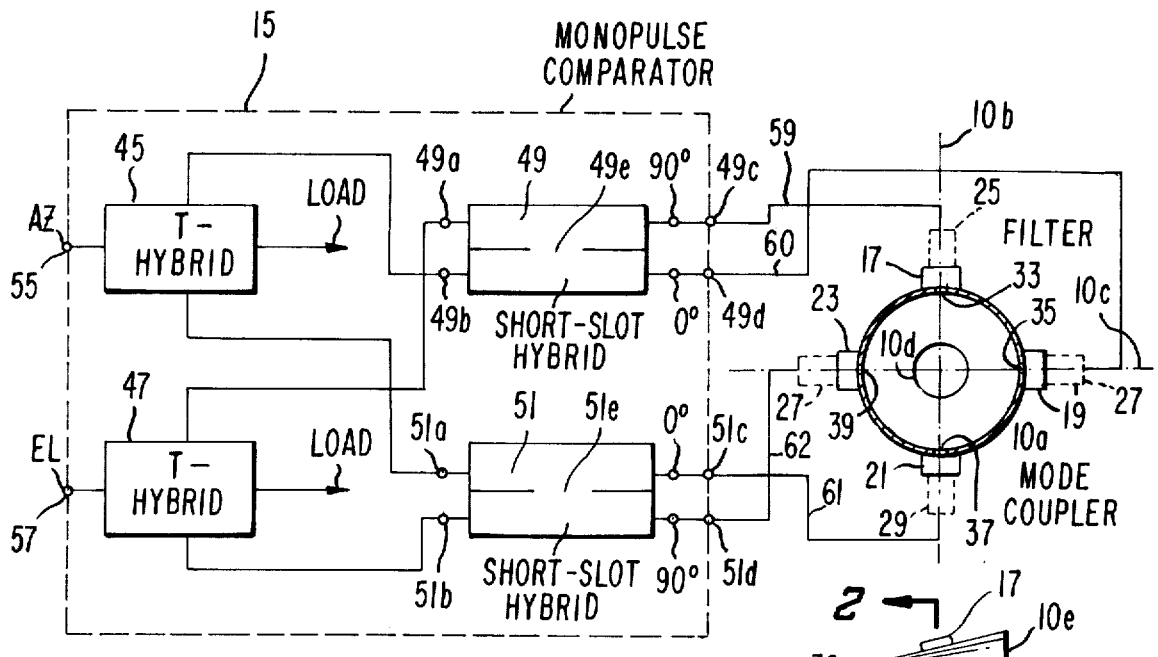
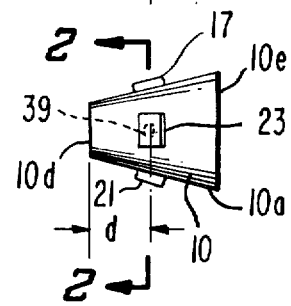
Fig. 1.
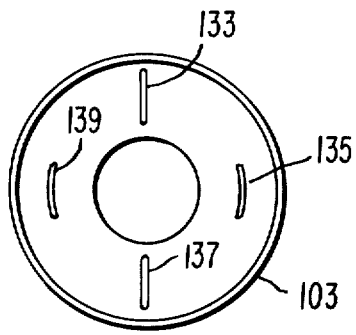
Fig. 2.
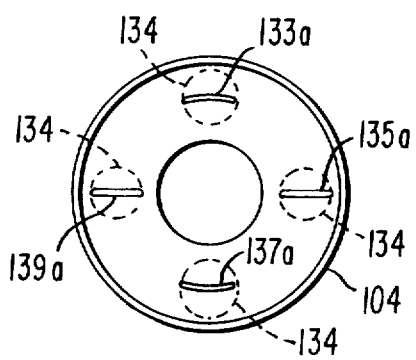
Fig. 3.
Fig. 4.
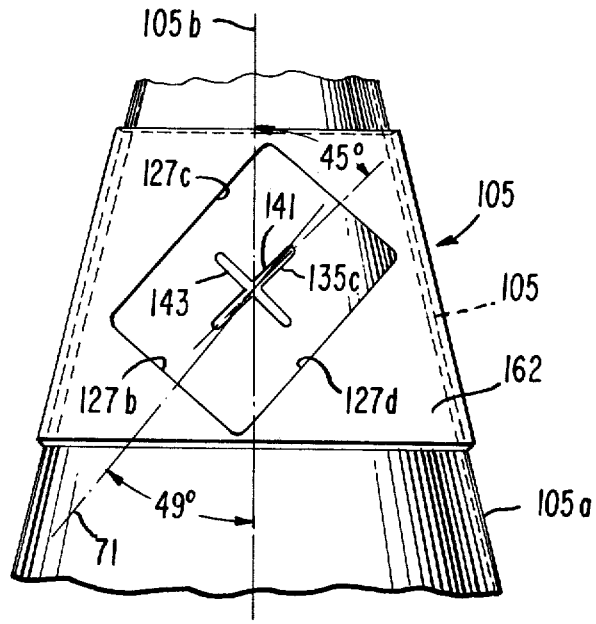
Fig. 9.

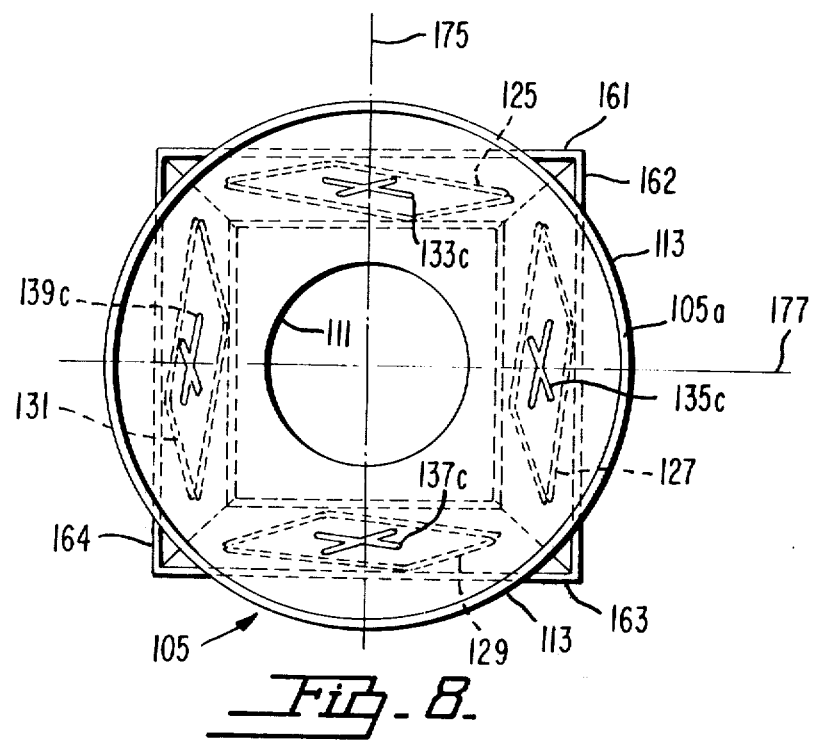
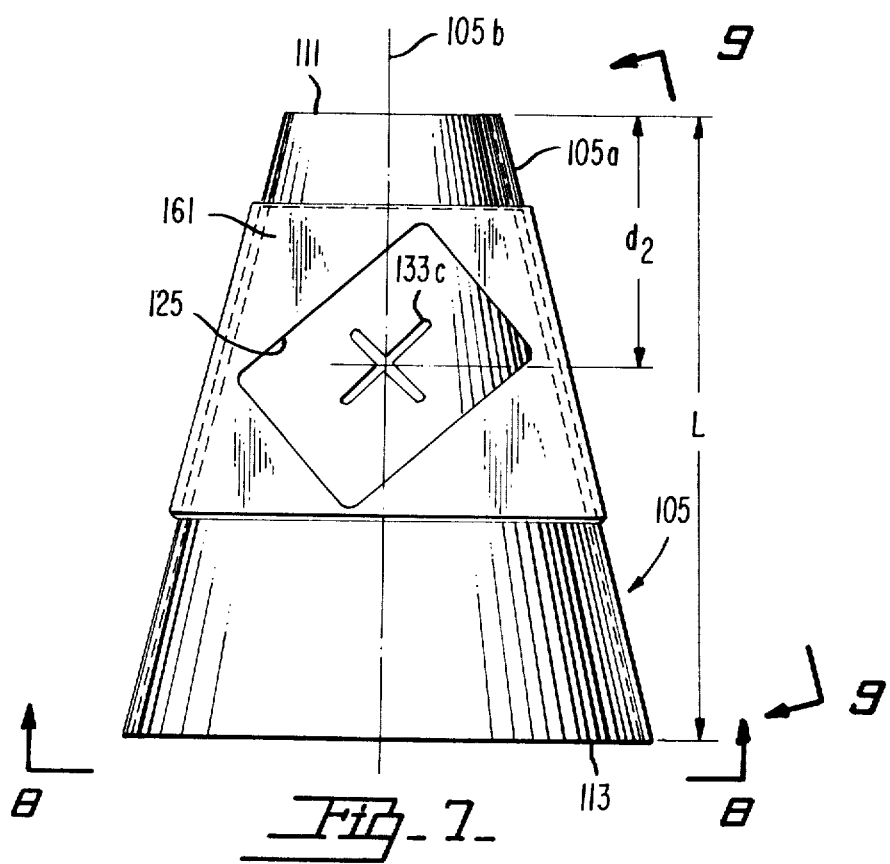

1

MULTIMODE COUPLING SYSTEM INCLUDING A FUNNEL-SHAPED MULTIMODE COUPLER

BACKGROUND OF THE INVENTION

This invention relates to a microwave coupling system and more particularly to a system by which a symmetrical and two orthogonal asymmetrical modes can be excited or received.

Antenna feed systems capable of generating and receiving microwave power in a plurality of modes have been developed and are known as multimode feed systems. Such multimode feed systems are often used in monopulse tracking antennas wherein the energy transmitted and received by the feed systems is combined in such a manner that sum (symmetrical) and difference mode (asymmetrical) radiation patterns are produced during transmission and/or reception. These patterns are analyzed to determine the position of a passive (reflecting) or active (radiating) object which may be either an aircraft, a missile, or a satellite or celestial body or to provide automatic tracking of these objects. Monopulse tracking systems are discussed for instance in, "Radar Handbook," by Merrill I. Skolnick, published 1970 by McGraw-Hill Book Co. and "Introduction to Monopulse," by D. R. Rhodes, published in 1959 by McGraw-Hill Book Co.

The typical tracking feed system may include several horns or apertures. When only a small number of horns are used, such as in the four-horn antennas, the radiation patterns have undesirable characteristics mainly in the form of high level sidelobes and internal losses which lower the efficiency (tracking slope) and increase the noise temperature of the system. Some prior art single aperture monopulse couplers although operative and possessing improved tracking slope, have lower than ideal gain to noise temperature ratio for their sum mode when they are used as feed systems for reflector-type antennas and when operated over a wide range of frequencies. For more details on a single aperture monopulse coupler, see pages 21–18 through 21–25 in the previously-cited "Radar Handbook."

One type of multimode coupler by which sum and difference modes can be launched into the throat of a single aperture horn is described in applicant's U.S. Pat. No. 3,560,976. It is desirable in certain applications such as in frequency reuse systems that higher gain over noise temperature (loss) ratios and particularly lower cross-polarization levels for the associated sum mode operation be provided. In frequency spectrum reuse applications for communication systems, the same frequency spectrum is reused but is communicated at orthogonal polarization. In such systems the total information carrying capacity of the system is improved by increasing the isolation between the two approximately orthogonal polarizations. This isolation, or level difference, between the two polarizations is usually maximum in the direction represented by the symmetry axis of the main beam. It is therefore highly desirable to achieve an accurate alignment of the antenna axis toward the other terminal of the link satellite by a high quality orthogonal difference mode to permit tracking. This however has to be done with minimum noise temperature (loss) contribution from the tracking circuit to the communication circuit and by minimum depolarization effect from the tracking circuit itself to the sum channel circuit.

BRIEF DESCRIPTION OF THE INVENTION

Briefly, a multimode coupling system is provided for coupling symmetrical and asymmetrical mode signals. The system includes a generally funnel-shaped hollow coupling member shaped to have at least two orthogonal symmetry planes. The narrower end of the funnel-shaped member is adapted to pass symmetrical mode signals and may be coupled to a transmitter or a receiver and the broader end of the funnel-shaped member is adapted to be coupled to free space or to the throat of a horn radiator. Asymmetrical mode coupling is provided through a plurality of side wall coupling apertures. A first and second of these coupling apertures are located in the side wall of the member at diametrically opposite surfaces of the member and in a first of the two orthogonal symmetry planes. A third and fourth pair of these coupling apertures are located in the side wall of the member at diametrically opposite surfaces in the second orthogonal plane. Asymmetrical mode signal coupling is achieved by a coupling circuit that in response to signals at an asymmetrical mode terminal couples approximately onequarter of the energy to each of said plurality of side wall apertures with the phase of the signal at the first and third of these apertures being advanced 90° relative to the phase of the signals at the second and fourth of these apertures.

DETAILED DESCRIPTION OF INVENTION

A more detailed description follows in conjunction with the following drawings wherein:

FIG. 1 is an elevation view of a multimode monopulse coupler according to one embodiment of the present invention.

FIG. 2 illustrates a cross-sectional view of a multimode monopulse coupler in FIG. 1 taken along lines 2—2 and a block diagram of the associated feed circuit.

FIG. 3 is an end view of a monopulse coupler illustrating vertically oriented coupling slots according to one embodiment of the present invention.

FIG. 4 is an end view of a monopulse coupler illustrating horizontally oriented coupling slots according to another embodiment of the present invention.

FIG. 5 illustrates the $TE_{12}$ mode.

FIG. 7 is a top plan (an elevation) view of a multimode monopulse coupler according to another embodiment of the present invention for operating with circularly polarized tracking modes.

FIG. 8 is an end view of the coupler of FIG. 7 as taken along lines 8—8 in FIG. 7.

Figure 6:
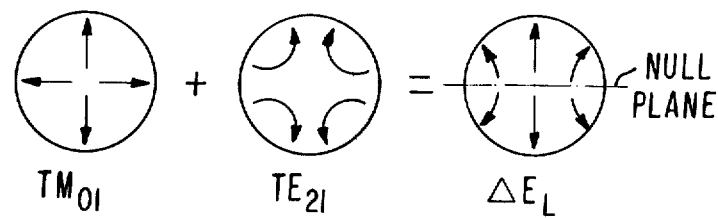
FIG. 6 illustrates the combined $TM_{01}$ and $TE_{21}$ mode.

Referring to FIGS. 1 and 2 a multimode coupler 10 and associated circuitry is illustrated. FIG. 1 is an elevation view of the coupler 10. FIG. 2 illustrates an end cross-sectional view of the multimode monopulse coupler 10 taken along lines 2—2 in FIG. 1 and a block diagram of the associated circuitry coupled thereto. The coupler 10 is a funnel-shaped hollow member 10a having orthogonal symmetry planes along lines 10b and 10c in FIG. 2. This coupler 10 is a funnel-shaped hollow member in the form of a hollow truncated cone. The narrow end 10d is arranged so that transmitted signal waves in the dominant symmetrical $TE_{11}$ mode pass with low reflection through the narrow end 10d and exit at the wide end 10e. A reciprocal signal flow occurs for receive operation for waves at the wider end 10e of the funnel-shaped member 10a. Asymmetrical or difference mode waves are coupled through side wall coupling apertures 33, 35, 37 and 39 into the funnel-shaped member 10a. The asymmetrical modes are for example the $TE_{21} + TM_{01}$ modes and the $TE_{12}$ mode in circular waveguide. The cross-sectional dimension of the coupler of the center of the side wall apertures is made so as to support the $TE_{12}$ mode. This mode has the lowest $\lambda_c/d$ ratio in use. Low reflection coefficient coupling of the waves at the coupling apertures is achieved by the proper placement of the coupling slots and by the proper phasing of the signals at these apertures. For optimum coupling, the coupling slots are located a distance d along the axis of the coupler from narrow end 10d. This length d is equal to approximately one half of the guide wavelength of the $TE_{21}$ asymmetrical mode or multiple thereof at the desired coupling frequencies. The processing of the asymmetrical mode waves involves the use of the monopulse comparator 15, filters 17, 19, 21 and 23 and the coupling apertures 33, 35, 37 and 39 in the coupler 10. The slots 33, 35, 37 and 39 are represented in FIG. 2 by a gap in the outline of member 10a. The slots 33 and 37 are at diametrically opposite surfaces of the funnel-shaped hollow member 10a in one plane 10b (indicated by long and short dashed lines) and are associated with the coupling of first asymmetrical mode signal waves. The slots 35 and 39 are at diametrically opposite surfaces of the funnel-shaped member 10a in a plane 10c (indicated by long and short dashed lines) orthogonal to the plane of slots 33 and 37 and are associated with the coupling of second orthogonal asymmetrical mode waves. By the operation of the monopulse comparator circuitry 15, slots 33 and 37 are excited approximately 90° out of phase with each other and slots 35 and 39 are excited 90° out of phase with each other. The monopulse comparator consists of two magic tee hybrids (0° hybrids) 45 and 47 and two short slot hybrids (90° hybrids) 49 and 51 and connections therebetween. One of the magic tee hybrids 45 is coupled at one end to terminal 55 of the comparator 15 and at the opposite end to terminal 49b of short-slot hybrid 49 and terminal 51a of short-slot hybrid 51. The other magic tee hybrid 47 is coupled at one end to the terminal 57 of the monopulse coupler comparator 15 and at the opposite end to terminal 49a of short-slot hybrid 49 and terminal 51b of short-slot hybrid 51. The terminals 49c, 49d, 51c and 51d of short-slot hybrids 49 and 51 form the output terminals of the monopulse comparator 15.

The terminals 49c, 49d, 51c and 51d of the comparator are coupled via waveguide transmission lines 59, 60, 61 and 62 to the respective bandpass filters 17, 19, 21 and 23. Each of the filters 17, 19, 21 and 23 is designed to pass the signals at the tracking frequencies within the communications frequency band. For instance, of the communication bandwidth of from 3700 and 4200 MHz, the tracking filters 17, 19, 21 and 23 are tuned to $f_B \pm 10$ MHz, where $f_B$ is the beacon frequency of the tracking channel and is 3950 MHz. This beacon signal, for example, may be transmitted unmodulated from a satellite when the coupler herein is part of an earth station. In the above narrow band case, the effects of the coupler on circuit loss and radiation pattern will be restricted to 20 MHz of the overall 500 MHz communications band.

The coupling apertures 33, 35, 37 and 39 may take the form of slots, crossed slots, circular holes, etc. One of the bandpass filters 17, 19, 21 and 23 is adjacent to and in coupling relationship at one end to one of the coupling slots 33, 35, 37 and 39. Coupling slot 33 is in coupling relationship with bandpass filter 17. Coupling slot 35 is in coupling relationship with bandpass filter 19. Coupling slot 37 is in coupling relationship with bandpass filter 21. Coupling slot 39 is in coupling relationship with bandpass filter 23. Each of the filters is a section of rectangular or square waveguide capable of supporting the $TE_{10}$ mode. The end of the corresponding filter is located about one of the coupling slots 33, 35, 37 and 39. Each filter acts to signals at frequencies outside the passband of the filters propagating in the coupling member 10a as a short circuit placed directly on top of the slot and thus the communications signals outside the beacon frequencies remain unaffected by the slots.

In the case where the coupling aperture for asymmetrical mode signals is a single slot, the slot in the wall of the funnel-shaped coupling member has to be oriented according to the desired polarization attitude of this asymmetrical mode and the polarization of the filter has to be oriented perpendicular to the longer dimension of the slot. For instance, if the coupling member 10a is a hollow truncated cone shaped structure 103 (a funnel-shaped structure) as shown in FIG. 3 and horizontal linear polarization is desirable, then the slots 135 and 139 in the wall of the cone (corresponding to slots 35 and 39 in FIG. 2) must be vertical and the slots 133 and 137 in the wall of the cone corresponding to slots 33 and 37 in FIG. 2 must be in the vertical plane. Rectangular waveguide filters associated with the slots 133, 135, 137 and 139 would be oriented with the longer wall in the horizontal plane. The azimuth tracking information is derived from the null plane associated with the slots 135 and 139 and elevation tracking information is derived from the null plane associated with slots 133 and 137. However, for each case, all four slots are used to synthesize the required radiation.

If vertical polarization is desirable then the slots in the truncated cone shaped structure 104 are as shown in FIG. 4 wherein the slots 133a and 137a are horizontal and perpendicular to the vertical plane of the coupler and the slots 139a and 135a in the horizontal plane of the coupler are horizontal. Rectangular waveguide filters associated with the slots 133a, 135a, 137a and 139a would be oriented with the longer wall in the vertical plane perpendicular to these slots. If the polarization must enclose 45° with the tracking plane, then two of the diagonally opposite slots as shown in FIG. 3, for example, must be rotated clockwise relative to the axis of the coupler by 45° and the other two slots rotated counterclockwise relative to the axis of the coupler by 45°.

It must be noted that the above-described example is a special case of a more general case. When the slot configuration necessary for all possible polarization orientations are superimposed, then the envelope of the slots becomes a circular hole as shown by dashed lines 134 in FIG. 4. When such a coupling aperture shape is used the polarization of the tracking mode is not influenced any more by the slot shape, but it still influenced by the polarization attitude in the filter. When the filter is rectangular in cross-section, then the polarization in the filter is parallel to the narrow dimension of the waveguide used to construct the filter.

When the filter is made from square or circular waveguide and in such a way that it behaves identically to two orthogonal waveguide modes, then the polarization of the filter is determined by its input field. This input field can be conveniently determined by a waveguide-coaxial transition, producing $TE_{10}$ mode at the input of the filter. Under these conditions the polarization of the tracking modes is determined by the orientation of these input transitions in a similar fashion as described for the slot aperture case in connection with FIGS. 3 and 4.

A set of hybrids are used to achieve the proper phase relationship for azimuth tracking information at terminal 55 and elevation tracking information at terminal 57 in FIG. 1. The hybrids are coupled to each other and to the coupler as described previously and as shown in FIG. 2. The higher order modes used for providing the azimuth and elevation tracking information excite all of the coupler terminals in a certain phase relationship by the monopulse comparator 15 to achieve this information. These phase relationships are more easily understood by considering the transmit case where these higher order modes are excited in the coupler and by remembering the reciprocity theory of antennas that the reverse takes place in the coupling member 10a designed to support these modes during reception.

In condisering the transmit case, the azimuth tracking signals at terminal 55 are power divided at hybrid 45 and are coupled with equal phase and power levels to terminal 49b of hybrid 49 and terminal 51a of hybrid 51. The wave at terminal 49b is equally power divided with the output coupled to coupling slot 33 via terminal 49c undergoing 90° more phase shift than the wave coupled to slot 35. This additional phase shift is due to the coupling of the wave through the short slot 49e of hybrid 49. The azimuth tracking signals at terminals 51a are equally power divided with the output coupled to coupler slot 39 undergoing 90° more phase shift than the signals coupled to slot 37. With this phase and amplitude distribution the signal at the coupling slots 33 and 39 is undergoing 90° more phase shift than the signals at slots 35 and 37 as indicated in FIG. 2. If the slots are oriented for vertical polarization as, for example, shown in FIG. 4, the azimuth difference mode excited in the coupler 10 is the linearly polarized $TE_{12}$ mode in circular waveguide as shown in FIG. 5.

The elevation tracking signals at terminal 57 are power divided by hybrids 47, 49 and 51. This results in 90° more phase shift of the waves at coupling slots 35 and 37 than at coupling slots 33 and 39. When the coupling slots are oriented in the same direction as stated previously for vertically polarized waves, the elevation difference mode signals in the coupler are in the $TE_{21} + TM_{01}$ so called circular waveguide hybrid mode as shown in FIG. 6. For horizontal polarization the slots are rotated 90° as shown in FIG. 3 and the roles of the $TE_{12}$ and the hybrid $TE_{21} + TM_{01}$ mode is interchanged. As discussed previously, just the reciprocal operation takes place with respect to receiving tracking mode signals, namely for the vertically polarized case the received circular waveguide $TE_{12}$ modes in the coupler 10 provide azimuth tracking signals at terminal 55 and the hybrid $TE_{21} + TM_{01}$ modes in the coupler 10 provides elevation tracking signals at terminal 57.

Referring to FIGS. 7 through 10, a multimode monopulse feed coupler 105 is illustrated. This coupler is adapted to operate according to a preferred embodiment of the present invention with circularly polarized tracking modes. The coupler 105 is basically like that of coupler 10 in FIG. 1. The coupler 105 includes a funnel-shaped hollow horn member 105a with a circular cross-section (a hollow truncated cone). In the case of transmit mode of operation, the sum signal wave in the dominant $TE_{11}$ mode in circular waveguide enters into the coupling member 105a at the narrow end 111 of the member and leaves the coupler 105 at the large end 113 of the member. In the case of receive operation, the sum mode wave enters the large end 113 of the member and leaves the coupler 105 at the narrow end 111 of the member 105a. Tracking is accomplished using circularly polarized waveguide modes.

To provide circular polarization for the tracking modes, coupling apertures 133c, 135c, 137c and 139c are located in the funnel-shaped coupling member 105a. These coupling apertures are formed in this embodiment of crossed slots. These coupling apertures 133c, 135c, 137c and 139c correspond to coupling apertures 33, 35, 37 and 39 in FIG. 1. Apertures 133c and 137c are in the wall of hollow member 105a at opposite surfaces thereof and in one plane (indicated by short and long dashed lines 175 in FIG. 8) and apertures 135c and 139c are in the wall of hollow member 105a at opposite surfaces thereof and in a plane (indicated by short and long dashed lines 177 in FIG. 8) orthogonal to the plane of slots 133c and 137c. In this preferred embodiment using rectangular waveguide filters (filters 147, 149, 151 and 153 in FIG. 10) for the tracking bandpass filters, a plurality of coupling cavities 125, 127, 129 and 131 are mounted above apertures 133c, 135c, 137c and 139c and between each of these apertures and the corresponding bandpass filter as shown in FIGS. 7 through 10. As shown in FIG. 10, the filters 147, 149, 151 and 153 and the comparator 115 and the circuitry therebetween is like that described in connection with FIG. 2 but in this case there is the above-described coupling cavities 125, 127, 129 and 131 connected between each filter 147, 149, 151 and 153 and the corresponding coupling slots 133c, 135c, 137c and 139c. Each of these coupling crossed slot apertures 133c, 135c, 137c and 139c is formed of a pair of slots of slightly different lengths in the wall of the coupling member 105a which intersect each other midway between their ends. Each of these crossed slot apertures 133c, 135c, 137c and 139c is identical and they are identically arranged relative to the center line 105b of the coupling member 105a. Considering for explanation the transmit case, these crossed slot apertures are provided in the wall of the conically shaped member 105a to excite two simultaneous orthogonal components. The 90° phase relationship required for circular polarization is achieved by providing the proper lengths to the slots forming the cross and by providing a corresponding height and width of the coupling cavities. The slots are arranged with one slot of the pair of crossed slots slightly longer and the other slot slightly shorter than free space half wavelength at the beacon frequencies so that one slot is below resonance and the other is slightly above resonance at the beacon frequencies whereby the fields in the crossed slots are 90° in phase relative to each other. The height and width of the coupling cavities 125, 127, 129 and 131 located above the crossed slot apertures 133c, 135c, 137c and 139c respectively are arranged so that there are two broad and two narrower walls and so that the broader walls are nearly parallel to the longer slots of the crossed pair of slots and the narrower walls are nearly parallel to the shorter slots of the crossed slots.

Figure 9:
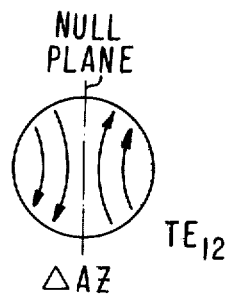
FIG. 9 is a partial elevation view of FIG. 7 as taken along lines 9—9 in FIG. 7.
Figure 10:
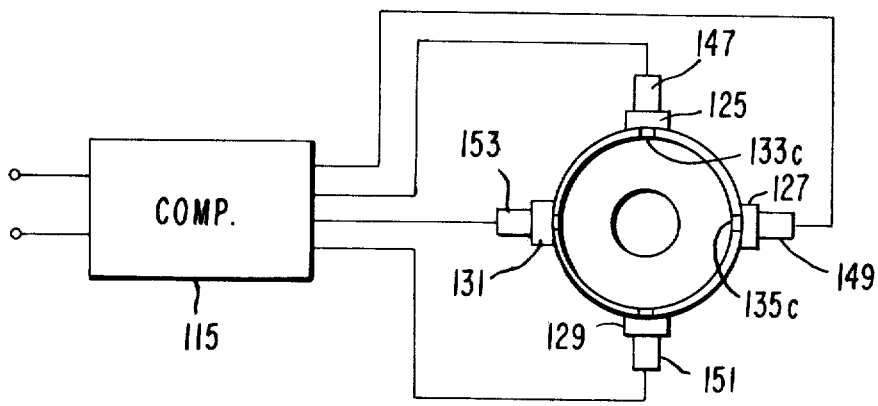
FIG. 10 is a diagram illustrating the coupler in FIG. 7 and associated feed circuit.

Referring to FIG. 9, aperture 135c is made up of slots 141 and 143 intersecting each other in a perpendicular relationship at their centers. Slot 141 makes a 45° angle with the center line 105b of the coupling member 105a. The length of slot 141 together with the width is made to be resonant at frequencies slightly below the desired tracking coupling frequencies so as to present an inductive reactance to the desired tracking coupling frequencies. The length of slot 143 together with its width is made to be resonant at frequencies slightly above the desired tracking frequencies so as to present a capacitive reactance at the desired tracking frequencies. This above dimensioning together with the geometry of the slots achieves at the tracking frequencies excitation of the two arms of the cross approximately 90° from each and their combined reactance disappears.

The rectangular coupling cavity inclination angle relative to the slots controls the amplitude equality between fields in the cross arms and also corrects the phase departure from 90° to achieve circular polarized waves. In the embodiment shown in FIGS. 7 through 10 the waveguide cavities 125, 127, 129 and 131 are formed in metallic plates 161, 162, 163 and 164 which plates extend tangential to the outer wall of hollow member 105a of conically shaped coupler 105. Each of the waveguide cavities 125, 127, 129 and 131 formed in the plates 161, 162, 163 and 164 respectively are centered over the crossed slot apertures 133c, 135c, 137c and 139c respectively. Each of the metallic plates 161, 162, 163 and 164 have a cross shaped aperture therein at the base of the cavities 125, 127, 129 and 131 which aperture matches the apertures 133c, 135c, 137c and 139c. The dimension of the rectangular waveguide cavities 125, 127, 129 and 131 formed in each plate 161, 162, 163 and 164 is such as to support two orthogonal $TE_{10}$ modes at the tracking signal frequencies. As mentioned previously, the bandpass filters 147, 149, 151 and 153 and monopulse comparator circuitry 15 as shown in FIG. 10 are coupled to the end of the cavities 125, 127, 129 and 131 opposite the slotted end. The length of the rectangular waveguide cavity section or the axial length of the cavities 125, 127, 129 and 131 as mentioned previously should be made small compared to a wavelength or approximately half guide wavelength or multiple of it. The length of the cavities should in theory be a half wavelength or multiple thereof to present at the coupling apertures in the coupler a short circuit except for frequencies within the tracking frequency band. In practice, it is desirable, however, to make the length as short as possible in which case the coupler becomes frequency independent outside of the passband of the filter. The length may be made as close as possible to zero to present practically the same impedances that would occur if the cavity length was a half wavelength or whole multiple thereof. In the preferred case the axial length of the cavity is made 1/16 of a wavelength ($\lambda/16$) and the filter is placed directly above the tracking slot. The rectangular cavity 127 as shown in FIG. 9 is oriented so that the narrower walls 127a and 127b of the waveguide are approximately parallel to the shorter slot 143 of the two crossed slots and the broader walls 127c and 127d are approximately parallel to the longer slot 141 of the two crossed slots. Also the broader walls 127c and 127d may be made longer than the shorter walls 127a and 127b by the same proportion slot 141 is relatively longer than slot 143. As shown in FIG. 9, the cavity 127 has a slight inclination relative to the slots 141 and 143. This angle is about 4°with the angle between the center line 71 of the cavity and the center line of the coupling member 105a being 49°.

For operation over the previously described communications and tracking frequencies the coupler 105 in FIGS. 7 thru 9 has by way of example the following dimensions.

opening at end 113 = 6.35 in.
opening at end 111 = 2.44 in.
axial length L = 8.5 in.
distance from center of crossed slots to end 111 ($d_2$) = 3.40 in.
length of walls 127a or 127b = 2.00 in.
length of walls 127c or 127d = 3.47 in.
axial length of cavity = at 0.663 in.
length of slot 141 = 1.812 in., width = .062
length of slot 143 = 1.78 in., width = .062

The generation of the orthogonal circular tracking modes (RCP and LCP) occurs due to the phase relationship discussed previously as provided by the monopulse comparator circuit in combination with the above described coupler 105. With the arrangement shown in FIG. 2 and with all of the crossed coupling slots arranged as discussed previously in connection with FIGS. 7 thru 10 a right circularly polarized wave signal is associated with transmitter signals at the terminals 55 and 57 with azimuth tracking difference signals at terminal 55 and with elevation tracking difference signals at the other terminal 57. The azimuth difference mode information is associated with a circularly polarized wave made up of the combination of a vertically oriented and horizontally oriented $TE_{12}$ mode and the elevation information is associated with a circularly polarized wave made up of the hybrid mode of $TE_{21}$ + $TM_{01}$ modes.

Another way to excite circular polarization of the coupling aperture is by making the apertures 33, 35, 37 and 39 in FIG. 2 circular coupling apertures or crossed slots with equal slot lengths, filters 17, 19, 21 and 23 in FIG. 2 as described previously, capable of supporting two identical, orthogonal waveguide modes by making their cross-section square or circular and by providing a linear to circular polarizer (indicated by dashed lines 25, 27, 29 and 31 in FIG. 2). The filters are placed above the coupling apertures and the linear to circular polarizer is connected between each filter and the monopulse comparator 15. When such filters are excited at their input terminal by a circularly polarized wave generated at the polarizer, the wave remains circularly polarized at the output (coupling) aperture. The input circularly polarized field for instance is generated by the linear to circular transducer. Such transducers can be built for instance by exciting a nearly square shaped rectangular waveguide section by a coaxial to waveguide transition probe which is placed in the diagonal plane of the waveguide. Although such a polarizer has a narrow bandwidth, it is comparable to the bandwidth of the filter. The coaxial input terminal can be directly coupled to the linearly polarized waves at the output of the comparator. Many other well known types of polarizers can be used converting linearly polarized waves into circular polarized waves. Another type of such polarizer using fins is described in U.S. Pat. No. 3,233,241. It is essential that some means be provided for exciting and supporting orthogonal linear modes and for providing essentially 90° differential phase shift between the signal waves in the two modes.

What is claimed is:

1. A coupling system for symmetrical mode signals and asymmetrical mode signals comprising:
   a hollow truncated cone shaped member having tapering side walls and two orthogonal symmetry planes and a first opening at one end and a larger opening at the opposite end, said first opening at one end adapted to present a low reflection coefficient coupling path to symmetrical mode signals,
   an asymmetrical mode signal terminal,
   first and second coupling apertures in the tapering side wall of said hollow member with said first and second side wall apertures at diametrically opposite surfaces of said member in one of said symmetry planes,
   third and fourth coupling apertures in the tapering side wall of said hollow member with said third and fourth side wall apertures at diametrically opposite surfaces of said member in the second of said orthogonal symmetry planes,
   and coupling means coupled between said first, second, third and fourth apertures and said asymmetrical mode signal terminal characterized by a response to signals at said terminal for coupling equal portions of the signal energy at the terminal to said first, second, third and fourth apertures with the phase of the coupled signals at the first and third apertures being advanced 90° relative to the phase of the signals at the second and fourth apertures.

2. The combination as claimed in claim 1, wherein the spacing of said first, second, third and fourth side wall apertures from said one end is selected to achieve optimized coupling to the asymmetrical mode signals.

3. The combination as claimed in claim 1, wherein said spacing between said first, second, third and fourth side wall apertures and said one end is on the order of one half wavelength or multiple thereof at the asymmetrical mode signal frequencies.

4. The combination as claimed in claim 1, including a second asymmetrical mode signal terminal and wherein said coupling means is further characterized by a response to signals at the second mentioned asymmetrical terminal for coupling equal portions of the signal energy at said second mentioned asymmetrical terminal to said first, second, third and fourth apertures with the phase of the coupled signals at the second and fourth apertures being advanced 90° relative to the phase of the signals at the first and third apertures.

5. The combination as claimed in claim 4, wherein said asymmetrical mode signals include the $TM_{01}$, $TE_{21}$ and $TE_{12}$ modes.

6. The combination as claimed in claim 1, wherein said side wall apertures are slots.

7. The combination as claimed in claim 1, wherein each of said side wall apertures are made up of cross-slots.

8. The combination as claimed in claim 1, wherein each of said side wall apertures are made up of circular holes.

9. The combination as claimed in claim 1, wherein said asymmetrical mode signals include circularly polarized $TM_{01} + TE_{21}$ modes (vertical) and circularly polarized $TE_{12}$ (horizontal) modes.

10. A feed system for receiving or transmitting first signals over a first band of frequencies and for receiving polarization diverse difference tracking signals over a narrower band of frequencies within said first band of frequencies, said feed system comprising:
    a hollow truncated cone shaped member having tapering side walls and two orthogonal symmetry planes and a first opening at one end adapted to be coupled to a transmitter or a receiver and a larger opening at the opposite end adapted to be coupled to free space,
    a first pair of coupling apertures in the tapering side wall of said hollow member at diametrically opposite surfaces of the member in one of said symmetry planes,
    a second pair of coupling apertures in the tapering side wall of said hollow member at diametrically opposite surfaces of the member in the second of said symmetry planes,
    a first tracking terminal for sensed angle tracking errors in said one symmetry plane and a second tracking terminal for sensed angle tracking errors in said second plane,
    angle sensing comparator means coupled between both said first and second pair of apertures and said first and second tracking terminals for receiving and angle sensing polarization diverse tracking signals within said narrower band of frequencies to provide first angle sensed tracking error signals at said first terminal and to provide second orthogonal angle sensed error signals at said second terminal.

11. The combination as claimed in claim 10, wherein said comparator means for receiving and angle sensing polarization diverse tracking signals within said narrower band of frequencies includes a narrow band filter adapted to pass only signals within said narrower band of frequencies with low attenuation mounted with respect to each of said apertures to present to all signals outside of said narrower band of frequencies a short circuit across said apertures.

12. The combination as claimed in claim 11, wherein said comparator means is arranged with a first aperture of said first pair of coupling apertures and a first aperture of said second pair of coupling apertures providing signal waves that are advanced 90° relative to signal waves at the remaining two apertures in response to signal waves applied at said first tracking terminal and wherein said remaining two apertures provide signal waves that are advanced 90° relative to signal waves at said first apertures of said first and second pair of apertures in response to signal waves applied at said second tracking terminal.

13. The combination as claimed in claim 12, wherein each of said first and second pairs of apertures are made up of crossed slots.

14. The combination as claimed in claim 13, wherein one of said slots is oriented to be about a 45° angle with respect to the axis of said funnel-shaped member.

15. The combination as claimed in claim 13, wherein one of said slots is slightly longer than the other of said slots forming the cross so that the longer slot is slightly below resonance and the other is slightly above resonance at a frequency within said narrower band of frequencies.

16. The combination as claimed in claim 15, wherein said first and second slots forming the aperture intersect each other at the midpoint and are orthogonal to each other.

17. The combination as claimed in claim 13, wherein said comparator means coupled between said apertures and said first and second tracking terminals include a rectangular waveguide cavity capable of supporting orthogonal $TE_{10}$ modes coupled between each of said narrow band filters and each of said apertures.

18. The combination as claimed in claim 17, wherein the length of said cavity is determined so that each of said narrow band filters presents a short circuit across said apertures to signals outside of said narrower band of frequencies.

19. The combination as claimed in claim 18, wherein said cavity has a pair of broad walls and a pair of narrow walls with the broader of the walls nearly parallel to the longer of said pair of crossed slots and the narrower walls nearly parallel to the shorter of the pair of crossed slots.

20. The combination as claimed in claim 10, wherein each of said first and second pairs of apertures are made up of circular holes.

21. The combination as claimed in claim 20, wherein an orthogonally polarizable filter is coupled to each of said circular holes at one end thereof and each of said filters are coupled at the opposite end to a linearly to circularly polarized wave transducer.

22. The combination as claimed in claim 10, wherein each of said first and second pairs of apertures are made up of crossed slots of equal lengths.

23. The combination as claimed in claim 22, wherein an orthogonally polarizable filter is coupled to each of said crossed slots of equal length at one end thereof and each of said filters at the opposite end thereof to a linearly to circularly polarized wave transducer.

* * * * *